US009213691B2

(12) United States Patent
Johnson et al.

(10) Patent No.: US 9,213,691 B2
(45) Date of Patent: Dec. 15, 2015

(54) REFINING HIERARCHIES IN OBJECT-ORIENTED MODELS

(71) Applicant: International Business Machines Corporation, Armonk, NY (US)

(72) Inventors: Peter J. Johnson, Hursley Park (GB); Stephen J. Upton, Hants (GB)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/782,239

(22) Filed: Mar. 1, 2013

(65) Prior Publication Data

US 2014/0074456 A1    Mar. 13, 2014

(30) Foreign Application Priority Data

Sep. 11, 2012   (GB) .................................. 1216166.7

(51) Int. Cl.
| | |
|---|---|
| G06F 9/44 | (2006.01) |
| G06F 17/27 | (2006.01) |
| G06F 17/28 | (2006.01) |
| G06Q 10/06 | (2012.01) |

(52) U.S. Cl.
CPC ............ *G06F 17/28* (2013.01); *G06F 17/2785* (2013.01); *G06F 17/2795* (2013.01); *G06Q 10/06* (2013.01); *G06Q 10/067* (2013.01)

(58) Field of Classification Search
USPC ....................................................... 717/104
See application file for complete search history.

(56) References Cited

U.S. PATENT DOCUMENTS

| | | |
|---|---|---|
| 6,789,252 B1 | 9/2004 | Burke et al. |
| 7,613,666 B1 | 11/2009 | Baisley |
| 7,761,478 B2 | 7/2010 | Akkiraju et al. |
| 7,818,277 B2 | 10/2010 | Rouvellou et al. |
| 8,135,576 B2 | 3/2012 | Haley et al. |
| 2005/0229150 A1* | 10/2005 | Ronnewinkel ................. 717/101 |
| 2007/0226233 A1* | 9/2007 | Walter et al. .................. 707/100 |
| 2008/0086717 A1* | 4/2008 | Brunn et al. ................... 717/117 |
| 2009/0138258 A1 | 5/2009 | Neale |
| 2009/0234640 A1 | 9/2009 | Boegl et al. |

OTHER PUBLICATIONS

Jarrar, et al., "Multilingual Verbalization of ORM Conceptual Models and Axiomatized Ontologies". Technical report. STARLab, Vrije Universiteit Brussel, Feb. 2006, 13 pages.

(Continued)

*Primary Examiner* — Hang Pan
(74) *Attorney, Agent, or Firm* — Cantor Colburn LLP; Terry Carroll

(57) ABSTRACT

Embodiments are directed to refining hierarchies in object-oriented models. A method includes providing a business object model in the form of an object-oriented model having one or more members with multiple distinct verbalizations and identifying distinct verbalizations of a given business object model member. The method also includes reviewing existing rules of the business object model to produce mappings of the distinct verbalizations and any attributes or operations used in conjunction with the distinct verbalizations of members of the business object model and analysing the mappings to identify patterns of use of the distinct verbalizations. The method further includes categorising a distinct verbalization as a superclass or subclass.

16 Claims, 3 Drawing Sheets

(56) References Cited

OTHER PUBLICATIONS

Anonymous, "A Feedback Mechanism to the Author of a Business Rule Which Provides a Rating of How Natural the Rule is With Respect to the English Language", IP.com Prior Art Database Dislosure; IP.com Disclosure No. IPCOM000199492D; Publication Date: Sep. 6, 2010; http://priorartdatabase.com/IPCOM/000199492; 2 pages.

* cited by examiner

REFINING HIERARCHIES IN OBJECT-ORIENTED MODELS

CROSS-REFERENCE TO RELATED APPLICATIONS

This application claims priority from GB Patent Application No. 1216166.7, filed on Sep. 11, 2012, the entire contents of which are incorporated herein by reference.

BACKGROUND

The present disclosure relates to the field of business rules management systems. In particular, the present disclosure relates to refining hierarchies in object-oriented models of business rules management systems.

Business Rules Management Systems (BRMS) are used in a Business Object Models (BOM) to define the underlying structure of business object rules that are being executed. The BOM may contain verbalization information that is used by a rule editor system to allow for natural language business rules to be constructed.

By verbalizing BOM members in this way and allowing users to define their own verbalizations, BOM members can be referred to by multiple identifiers, or verbalizations. For example, an import/export company may deal with both "importers" and "exporters", which have many attributes and operations in common. One way of representing this relationship would be to have several verbalizations associated with a single "customer" BOM entry, as both importers and exporters are "customers" of the company. Doing so allows business users to write rules in natural language and use whichever verbalization makes sense in the given context.

Although in many situations this mapping of multiple verbalizations to a single BOM member is acceptable, there are occasions when the many-to-one verbalization to BOM member relationship can cause issues. For example, a method or attribute may be added that is only applicable to an "importer," but as a result of the verbalization, it would be possible to construct a nonsensical rule, such as: "If the date of the last import of the exporter is earlier than . . . "

Although technically correct, it is semantically incorrect as an exporter would not have a history of imports. To most business users, no problem would be perceived, even though they would be able to write rules that made little sense and would produce invalid results allowing the problem to go undetected for long periods.

SUMMARY

Exemplary embodiments include a computer implemented method for refining hierarchies in object-oriented models. The method includes providing a business object model in the form of an object-oriented model having one or more members with multiple distinct verbalizations and identifying distinct verbalizations of a given business object model member. The method also includes reviewing existing rules of the business object model to produce mappings of the distinct verbalizations and any attributes or operations used in conjunction with the distinct verbalizations of members of the business object model and analysing the mappings to identify patterns of use of the distinct verbalizations. The method further includes categorising a distinct verbalization as a superclass or subclass.

Exemplary embodiments also include a computer system for refining hierarchies in object-oriented models having a business object model in the form of an object-oriented model having one or more members with multiple distinct verbalizations. The system also includes a data gathering component having a verbalization identifying component for identifying distinct verbalizations of a given business object model member. The system further includes a rule reviewing component for reviewing existing rules of the business object model to produce mappings of the distinct verbalizations and any attributes or operations used in conjunction with the distinct verbalizations of members of the business object model. The system also includes an analysis component for analysing the mappings to identify patterns of use of the distinct verbalizations and for categorising a distinct verbalization as a superclass or subclass.

Exemplary embodiments further include a computer program product for refining hierarchies in object-oriented models, the computer program product comprising a computer readable storage medium having computer-readable program code embodied therewith, the computer-readable program code configured to perform a method. The method includes providing a business object model in the form of an object-oriented model having one or more members with multiple distinct verbalizations and identifying distinct verbalizations of a given business object model member. The method also includes reviewing existing rules of the business object model to produce mappings of the distinct verbalizations and any attributes or operations used in conjunction with the distinct verbalizations of members of the business object model and analysing the mappings to identify patterns of use of the distinct verbalizations. The method further includes categorising a distinct verbalization as a superclass or subclass.

The described aspects of the disclosure provide the advantage of determining and suggesting an optimal class hierarchy based on usage patterns of verbalizations of a class with multiple distinct verbalizations.

BRIEF DESCRIPTION OF THE SEVERAL VIEWS OF THE DRAWINGS

Embodiments of the present disclosure will now be described, by way of example only, with reference to the following drawings in which.

DETAILED DESCRIPTION

Figure 1:
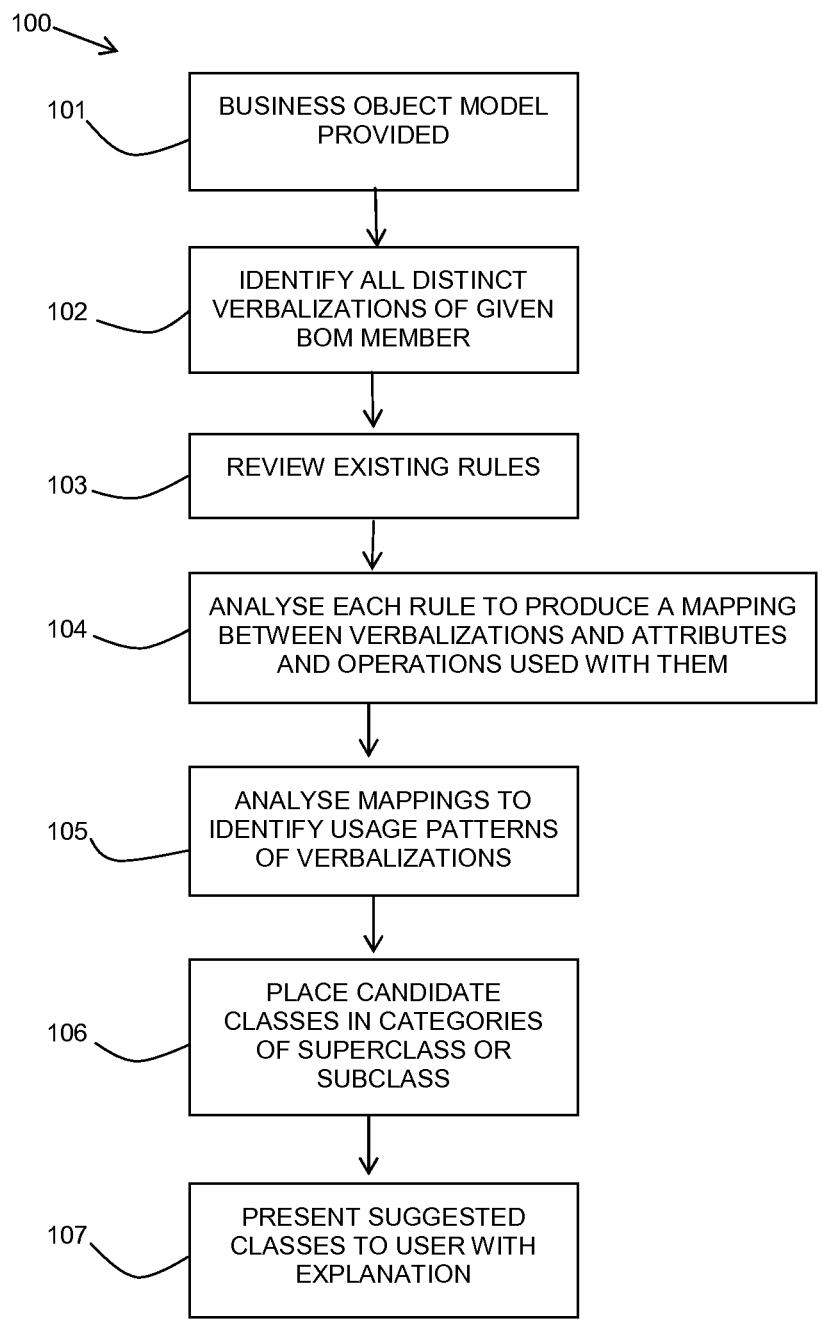
FIG. 1 is a flow diagram of a method for refining hierarchies in object-oriented models in accordance with an exemplary embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the disclosure. However, it will be understood by those skilled in the art that the present disclosure may be practiced without these specific details. In other instances, well-known methods, procedures, and components have not been described in detail so as not to obscure the present disclosure.

Exemplary embodiments include methods and systems for analyzing the usage patterns of distinct business object model (BOM) verbalizations, including which attributes and operations are typically used with them and which are not, and refining class hierarchies for the BOM. Refining class hierarchies may suggest potential changes to the structure of the BOM that would prevent potentially nonsensical rules being written.

In exemplary embodiments, a BOM may be an object-oriented model using rules which may be defined by a user, for example, using a rule editor. The described method takes an existing object-oriented model that is explicitly mapped to a vocabulary (i.e. the BOM) and uses usage patterns of this vocabulary with respect to object hierarchy entities to refine and improve the hierarchy.

For all subsequent examples, the following hypothetical BOM will be used:

| BOM Member | Verbalizations | Attributes |
|---|---|---|
| Customer | "the customer", "a customer", "the customers", "the importer", "an importer", "the importers", "the exporter", "an exporter", "the exporters" | customerID, name, companyReference, dateOfLastImport, dateOfLastExport |

Referring to FIG. 1, a flow diagram 100 shows an example embodiment of the described method. In exemplary embodiments, the method may be divided into two aspects, a data gathering aspect which reviews existing rules and stores its results for later analysis, and an analysis aspect which analyses these results and suggests an optimal class hierarchy based on its findings.

As shown at block 101, the method includes providing a BOM to be refined. Next, as shown at block 102, all distinct verbalizations of a given BOM member are identified, as these may be treated as candidates for separate classes. In exemplary embodiments, the identification may be accomplished using simple language processing.

In the given example, customer, importer and exporter would be identified as distinct verbalizations and variations on them (i.e. "the customer", "a customer", "the customers") would be treated as the same by the method as they are referring to the same thing.

Once the identification is complete, all existing rules in the system may be reviewed to search for patterns of verbalization usage across them, as shown at block 103. In exemplary embodiments, the review may be conducted on all rules in the production environment managed by the BRIMS. For example, these may be deployed rule-apps in a Rule Team/Execution Server as these would be representative of the rules used by the company.

As shown at block 104, analysis of each rule is performed to produce a series of statistics and a mapping between verbalizations and attributes and operations used with them. The analysis may use a mapping between distinct verbalizations, and the attributes and operations used in conjunction with them may be generated. In one embodiment, this may be carried out using tuples. For example, a series of 3-tuples of the form (a1, a2, a3) may be used where:

a1=The distinct verbalization being used;
a2=The attribute or operation being used in conjunction with a1;
a3=The number of occurrences this specific combination of a1 and a2.

For example, if the following rule was analyzed, "If the name of the customer is equal to "Big Shipping Company" . . ."; the following tuple would be produced, (customer, name, 1).

As shown at block 105, analysis may then be carried out of the statistics for usage patterns. In the described embodiment, the tuples may be analyzed to identify those attributes that are commonly used with particular verbalizations and those that are rarely or never used in conjunction with others.

For example, if the following 3-tuples are analyzed, (customer, name, 70), (importer, name, 58), (exporter, name, 61). The method would identify that the attribute "name" appears to be relevant in all cases and in the event that "Customer", "Importer", and "Exporter" are split up into separate classes, then "name" should be in the superclass so that all subclasses inherit it.

In another example, conversely, if the following tuples are analyzed, (customer, dateOfLastImport, 0), (importer, dateOfLastImport, 82), (exporter, dateOfLastImport, 0), the method would identify that the attribute "dateOfLastImport" is only relevant to the verbalization "Importer" which would now be considered a specialization (i.e. subclass) of "Customer".

As shown at block 106, once analysis of all the verbalizations/attributes is complete, the candidate classes (i.e. the distinct verbalizations) are each placed in a category: In exemplary embodiments, candidate superclasses are those that are used in conjunction some attributes but have no attributes that are unique to them (i.e. no specialization). In exemplary embodiments, candidate subclasses are those that are used in conjunction with all of the attributes of a candidate superclass but also have attributes that are only used in conjunction with them (i.e. a specialization).

Distinct verbalizations of BOM members may be considered to be potential sub/superclasses. Different attributes may be associated with the sub/superclasses in the new hierarchy based on analysis of the verbalization usage patterns. In the example, "Customer" would be identified as a candidate superclass as it is used in conjunction with attributes "customerID", "name", and "companyReference", none of which are unique to "Customer" alone. "Exporter" and "Importer" would be candidate subclasses as they are both used in conjunction with all of the attributes that the candidate superclass ("Customer") uses in addition to being used in conjunction with attributes that are unique to them ("dateOfLastImport" in the case of "Importer" and "dateOfLastExport" for "Exporter").

If, as in the above example, a superclass and at least one subclass are identified, then the method may present this suggestion to the user along with an explanation of the reasoning behind the suggestion, as shown at block 107. The user may then be able to implement the optimal class hierarchy.

In the given example, the method may suggest the following BOM structure:

| BOM Member | Subclass of | Verbalizations | Attributes |
|---|---|---|---|
| Customer | | "the customer", "a customer", "the customers" | customerID, name, companyReference |
| Importer | Customer | "the importer", "an importer" "the importers" | dateOfLastImport |
| Exporter | Customer | "the exporter", "an exporter", "the exporters" | dateOfLastExport |

With this new structure, it is no longer possible to write semantically incorrect rules such as "If the date of the last import of the exporter is earlier than . . . ", thus solving the problem using only analysis of pre-existing data (i.e. the rules). In exemplary embodiments, to prevent erroneous/unfounded suggestions, the method may only suggest potential changes once it has reviewed a reasonable number of rules. For example, it would not suggest a new subclass after only observing <10 rules that use a particular verbalization/attribute.

In addition, to save unnecessary processing, the method may ignore classes with only a single distinct verbalization as these would not typically be candidates for splitting into multiple classes and the method described above would not be applicable to them.

Figure 2:
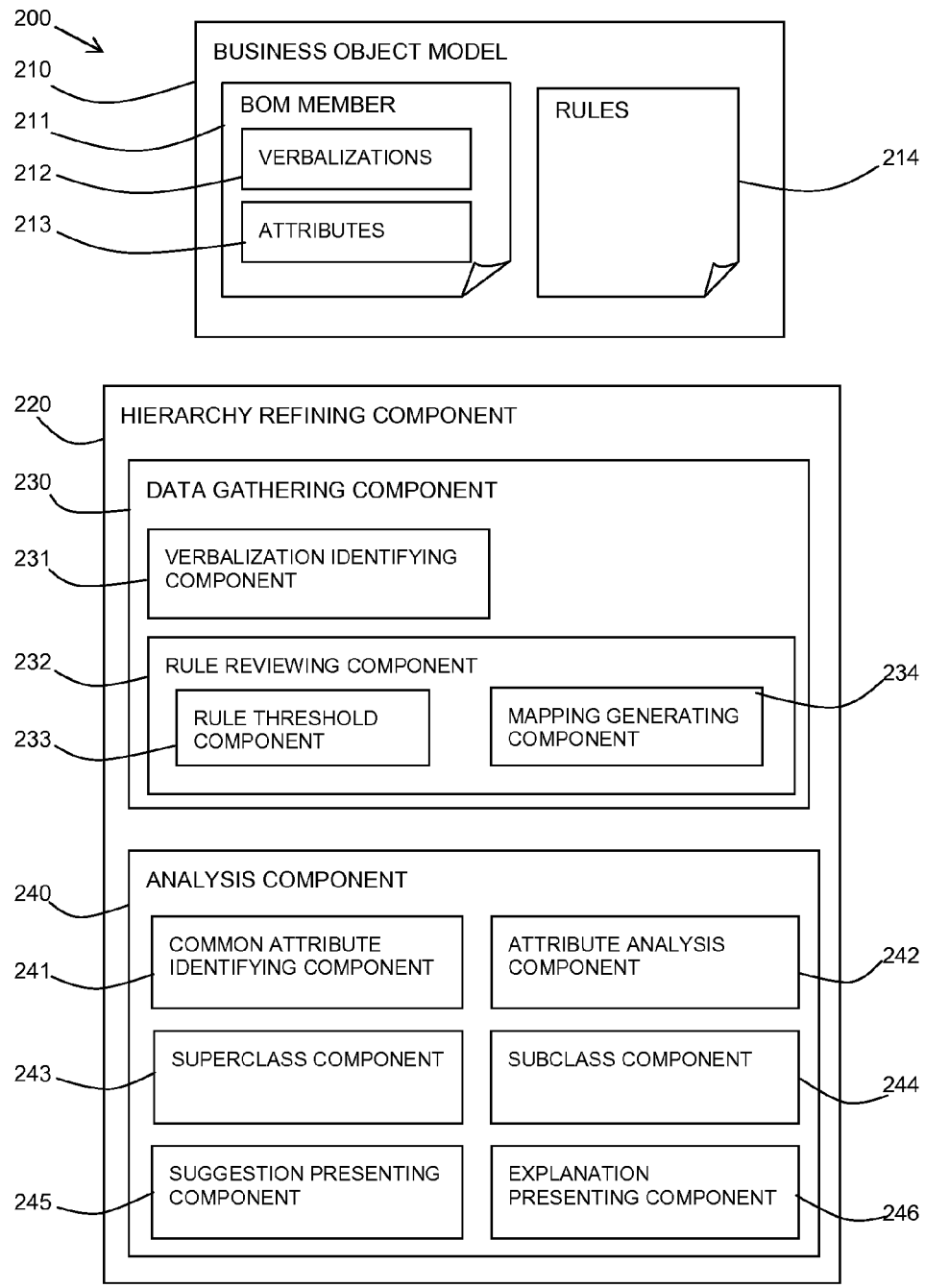
FIG. 2 is block diagram of a system for refining hierarchies in object-oriented models in accordance with the an exemplary embodiment.

Referring to FIG. 2, a block diagram of an exemplary embodiment of the described system 200 is shown. The system 200 includes a business object model (BOM) 210 in the form of an object-oriented model. The BOM 210 includes multiple BOM members 211 which may each have multiple verbalizations 212 and attributes 213. The BOM 210 may comprise rules 214 which apply to the BOM members 211 using the verbalizations 212 and attributes 213.

In exemplary embodiments, a hierarchy refining component 220 includes a data gathering component 230 for gathering data from existing usage patterns of BOM 210 verbalizations 212 of a class or BOM member 211. The hierarchy refining component 220 may also comprise an analysis component 240 for analysing the results of the gathered data and suggesting optimal class hierarchies.

In exemplary embodiments, the data gathering component 230 may comprise a verbalization identifying component 231 for identifying all distinct verbalizations 212 of a given BOM member 211 which may be treated as candidates for separate classes. The verbalization identifying component 231 may comprise a language processing component. The data gathering component 230 may also comprise a rule reviewing component 232 for reviewing the existing rules 214 of the BOM 210. The rule reviewing component 232 may comprise a rule threshold component 233 for determining a threshold number of reviewed rules before analysis may take place.

In exemplary embodiments, the rule reviewing component 232 may also comprise a mapping generating component 234 for mapping between distinct verbalizations, and the attributes and operations used in conjunction with them. In one embodiment, the mapping generating component 234 may generate a series of tuples for analysis. For example, a series of 3-tupes of the form (a1, a2, a3) may be used where:
a1=The distinct verbalization being used;
a2=The attribute or operation being used in conjunction with a1;
a3=The number of occurrences this specific combination of a1 and a2.

The analysis component 240 may analyze the mappings (for example, the series of tuples) generated by the mapping generating component 234. The analysis component 240 may comprise a common attribute identifying component 241 for identifying common attributes in tuples. An attribute analysis component 242 may group the verbalizations based on the common attributes or based on a lack of common attributes.

The analysis component 240 may comprise a superclass component 243 and a subclass component 244 for grouping the candidate classes (i.e. the distinct verbalizations) into a superclass or a subclass category.

The analysis component 240 may also comprise a suggestion presenting component 245 for presenting superclass and subclass suggestions to a user, thereby providing a suggested class hierarchy. An explanation presenting component 246 may be provided for explaining the reasoning behind the superclass and subclass suggestions.

Figure 3:
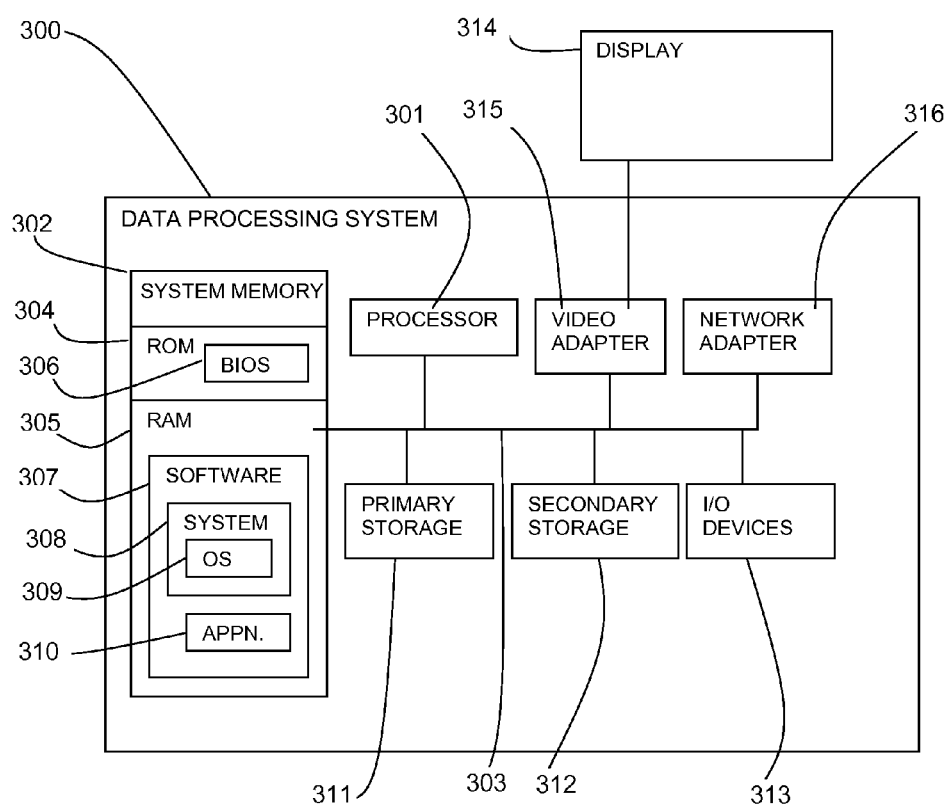
FIG. 3 is a block diagram of a computer system for refining hierarchies in object-oriented models in which an exemplary embodiment may be implemented.

Referring to FIG. 3, an exemplary system for implementing aspects of the disclosure comprises a data processing system 300 suitable for storing and/or executing program code comprising at least one processor 301 coupled directly or indirectly to memory elements through a bus system 303. The memory elements may comprise local memory employed during actual execution of the program code, bulk storage, and cache memories which provide temporary storage of at least some program code in order to reduce the number of times code must be retrieved from bulk storage during execution.

The memory elements may comprise system memory 302 in the form of read only memory (ROM) 304 and random access memory (RAM) 305. A basic input/output system (BIOS) 306 may be stored in ROM 304. System software 307 may be stored in RAM 305 comprising operating system software 308. Software applications 310 may also be stored in RAM 305.

The system 300 may also comprise a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 may be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may comprise speakers, printers, etc. A display device 314 is also connected to system bus 303 via an interface, such as video adapter 315.

The invention claimed is:

1. A computer implemented method for refining hierarchies in object-oriented models, comprising:
providing a business object model comprising one or more members with a plurality of distinct verbalizations;
receiving, by a processor, one or more existing rules that have previously been executed on the business object model by users;
identifying from the one or more existing rules the plurality of distinct verbalizations of the one or more members of the business object model;
reviewing the one or more existing rules to produce mappings of the plurality of distinct verbalizations and attributes used in conjunction with the plurality of distinct verbalizations of the one or more of the business object model;
analyzing, by the processor, the mappings to identify patterns of use between the plurality of distinct verbalizations and the attributes;
categorizing each of the plurality of distinct verbalizations as a superclass or a subclass based on the analysis of the mappings, where one of the plurality of distinct verbalizations is categorized in the superclass based on a determination that the one of the plurality of distinct verbalizations is used in conjunction with some attributes but has no attributes that are unique;
generating, by the processor, a new class hierarchy of distinct verbalizations based on the categorization of each of the plurality of distinct verbalizations; and
presenting the new class hierarchy to a user as a new proposed class hierarchy.

2. The computer implemented method of claim 1, further comprising associating an attribute with the superclass or the subclass in the new class hierarchy.

3. The computer implemented method of claim 1, wherein analyzing the mappings produces a series of 3-tuples including one of the plurality of distinct verbalization being used, the attribute being used in conjunction with the distinct verbalization being used, and the number of occurrences this specific combination of the attribute with the distinct verbalization being used.

4. The computer implemented method of claim 1, further comprising determining one or more attributes commonly used across the plurality of distinct verbalizations and associating a common attribute to the superclass.

5. The computer implemented method of claim 1, wherein categorizing one or more of the plurality of distinct verbalizations as a subclass applies to verbalizations that are used in conjunction with all of the attributes of a candidate superclass but also have attributes that are only used in conjunction a subset of the plurality of distinct verbalizations.

6. The computer implemented method of claim 5, comprising determining attributes only used for one verbalization and associating a single attribute with a subclass.

7. The computer implemented method of claim 1, wherein reviewing existing rules further comprises producing mappings only after a threshold number of rules has been reviewed.

8. The computer implemented method of claim 1, wherein classes with only a single distinct verbalization are disregarded.

9. The computer implemented method of claim 1, wherein identifying distinct verbalizations of a given business object model member uses language processing.

10. The computer implemented method of claim 1, wherein the existing rules of the business object model comprise rules in a production environment managed by a business rules management system.

11. The computer implemented method of claim 1, further comprising:
providing an explanation of the suggested superclass or the suggested subclass to the user based on the analysis.

12. A computer system having a processor configured for refining hierarchies in object-oriented models comprising a business object model comprising one or more members with multiple distinct verbalizations and a data gathering component that stores existing rules of the business object model comprising:
a verbalization identifying component configured for identifying distinct verbalizations of the one or more members of the business object model; and
a rule reviewing component configured for reviewing the existing rules of the business object model to produce mappings of the distinct verbalizations and any attributes or operations used in conjunction with the distinct verbalizations of the one or more members of the business object model; and
an analysis component configured for analyzing, via the processor, the mappings to identify patterns of use of the distinct verbalizations and for categorizing a distinct verbalization as a superclass or a subclass,
wherein the rule reviewing component produces a series of 3-tuples including a distinct verbalization being used, the attribute or operation being used in conjunction with the distinct verbalization being used, and the number of occurrences this specific combination of the distinct verbalization being used and the attribute or operation being used in conjunction with the distinct verbalization being used.

13. The computer system of claim 12, wherein the analysis component is configured for generating a new class hierarchy of distinct verbalizations using the categorized superclasses and subclasses.

14. The computer system of claim 12, wherein the rule reviewing component comprises a rule threshold component configured for determining if a threshold number of rules have been reviewed and producing mappings only if it is determined that the threshold number has been exceeded.

15. The computer system of claim 12, further comprising:
a suggestion presenting component configured for presenting a suggested superclass or a suggested subclass to a user as a new proposed class hierarchy.

16. A computer program product for refining hierarchies in object-oriented models, the computer program product comprising a non-transitory computer readable storage medium having a computer readable program code embodied therewith, the computer readable program code comprising computer readable program code configured for:
providing a business object model comprising one or more members with a plurality of distinct verbalizations;
receiving one or more existing rules that have previously been executed on the business object model by users
identifying from the one or more existing rules the plurality of distinct verbalizations of the one or more members of the business object model;
reviewing the one or more existing rules to produce mappings of the plurality of distinct verbalizations and attributes used in conjunction with the plurality of distinct verbalizations of the one or more members of the business object model;
analyzing the mappings to identify patterns between the use of the plurality of distinct verbalizations and the attributes; and
categorizing each of the plurality of distinct verbalization as a superclass or a subclass based on the analysis of the mappings, where one of the plurality of distinct verbalization is categorized in the super class based on a determination that the one of the plurality of distinct verbalization is used in conjunction with some attributes but has no attributes that are unique;
generating new class hierarchy of distinct verbalizations based on the categorization of each of the plurality of distinct verbalizations; and
presenting the new class hierarchy to a user as a new proposed class hierarchy.

* * * * *